United States Patent
Cao et al.

(10) Patent No.: US 11,257,367 B2
(45) Date of Patent: Feb. 22, 2022

(54) SYSTEM AND METHOD FOR CONTROLLING TRAFFIC LIGHTS

(71) Applicant: BAIDU ONLINE NETWORK TECHNOLOGY (BEIJING) CO., LTD., Beijing (CN)

(72) Inventors: Huo Cao, Beijing (CN); Xing Hu, Beijing (CN); Sheng Tao, Beijing (CN); Haisong Wang, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 295 days.

(21) Appl. No.: 16/538,610

(22) Filed: Aug. 12, 2019

(65) Prior Publication Data
US 2020/0074856 A1 Mar. 5, 2020

(30) Foreign Application Priority Data
Aug. 31, 2018 (CN) .......................... 201811012996.2

(51) Int. Cl.
*G08G 1/08* (2006.01)
*G08G 1/01* (2006.01)
(Continued)

(52) U.S. Cl.
CPC ............. *G08G 1/08* (2013.01); *G01S 17/87* (2013.01); *G01S 17/88* (2013.01); *G05D 1/0231* (2013.01);
(Continued)

(58) Field of Classification Search
CPC .......... G08G 1/08; G08G 1/0145; G08G 1/04; G08G 1/096783; G08G 1/0112;
(Continued)

(56) References Cited

U.S. PATENT DOCUMENTS 8,610,596 B2 * 12/2013 Johnson ................. G08G 1/097
340/906
2014/0210646 A1 * 7/2014 Subramanya ...... G06K 9/00812
340/928
(Continued)

FOREIGN PATENT DOCUMENTS

CN 102333184 A 1/2012
CN 202652362 U 1/2013
(Continued)

OTHER PUBLICATIONS

Chinese Patent Application No. 201811012996.2 First Office Action dated Jul. 13, 2020, 11 pages.
(Continued)

*Primary Examiner* — Russell Frejd
(74) *Attorney, Agent, or Firm* — Lathrop GPM LLP

(57) ABSTRACT

Provided are system and method for controlling traffic lights. The system includes a traffic light device and a smart roadside device. The smart roadside device includes a roadside sensing module including: a camera assembly configured to collect information of an image for traffic lights of the traffic light device and a radar configured to acquire first surrounding environment information of a road junction monitored by the smart roadside device, and a roadside processing module configured to determine traffic flow information of a red light lane according to the first surrounding environment information and the information of the image for the traffic lights, determine a duration of a green light according to the traffic flow information, and control a duration displaying the green light in a next cycle of the traffic light device according to the duration of the green light.

15 Claims, 4 Drawing Sheets

(51) Int. Cl.

| | | |
|---|---|---|
| *G08G 1/04* | (2006.01) | |
| *H04N 5/225* | (2006.01) | |
| *G05D 1/02* | (2020.01) | |
| *G01S 17/88* | (2006.01) | |
| *G01S 17/87* | (2020.01) | |
| *G06K 9/00* | (2006.01) | |

(52) U.S. Cl.
CPC ....... *G05D 1/0257* (2013.01); *G06K 9/00825* (2013.01); *G08G 1/0145* (2013.01); *G08G 1/04* (2013.01); *H04N 5/2253* (2013.01); *G05D 2201/0213* (2013.01)

(58) Field of Classification Search
CPC ........... G08G 1/0116; G08G 1/096725; G08G 1/095; G08G 1/07; G08G 1/09; H04N 5/2253; G05D 1/0231; G05D 1/0257; G05D 2201/0213; G01S 17/88; G01S 17/87; G06K 9/00825
See application file for complete search history.

(56) References Cited

U.S. PATENT DOCUMENTS

| | | | |
|---|---|---|---|
| 2014/0218527 | A1* | 8/2014 | Subramanya .......... G08G 1/142 348/148 |
| 2015/0213165 | A1* | 7/2015 | Roux ...................... G06F 30/23 703/8 |
| 2016/0318490 | A1* | 11/2016 | Ben Shalom ............. B60T 7/18 |
| 2017/0330456 | A1 | 11/2017 | Miller |
| 2018/0122231 | A1 | 5/2018 | Modi et al. |
| 2018/0158324 | A1 | 6/2018 | Benhammou et al. |
| 2019/0154439 | A1* | 5/2019 | Binder .................... G01S 15/08 |

FOREIGN PATENT DOCUMENTS

| | | |
|---|---|---|
| CN | 103379257 A | 10/2013 |
| CN | 104243772 A | 12/2014 |
| CN | 204904585 U | 12/2015 |
| CN | 106199603 A | 12/2016 |
| CN | 106384517 A | 2/2017 |
| CN | 205943100 U | 2/2017 |
| CN | 106846840 A | 6/2017 |
| CN | 107063275 A | 8/2017 |
| CN | 107230369 A | 10/2017 |
| CN | 107807633 A | 3/2018 |
| CN | 107945540 A | 4/2018 |
| GB | 2535320 A | 8/2016 |
| JP | 2001236593 A | 8/2001 |
| JP | 2003331385 A | 11/2003 |
| JP | 2006065818 A | 3/2006 |
| JP | 2006260313 A | 9/2006 |
| JP | 2012181651 A | 9/2012 |
| JP | 2012221091 A | 11/2012 |
| JP | 2016170642 A | 9/2016 |
| JP | 2016222143 A | 12/2016 |
| JP | 2017084367 A | 5/2017 |
| JP | 2017151041 A | 8/2017 |
| JP | 2017220129 A | 12/2017 |
| JP | 2018026009 A | 2/2018 |
| WO | WO 2016147350 A1 | 9/2016 |

OTHER PUBLICATIONS

Chinese Patent Application No. 201811012996.2 English translation of First Office Action dated Jul. 13, 2020, 12 pages.
Chinese Patent Application No. 201811012996.2, Decision on Rejection dated Apr. 26, 2021, 9 pages.
Chinese Patent Application No. 201811012996.2, English Translation of Decision on Rejection dated Apr. 26, 2021, 11 pages.
European Patent Application No. 19191670.9 extended Search and Opinion dated Jan. 20, 2020, 8 pages.
Japanese Patent Application No. 2019-156513 Office Action dated Nov. 4, 2020, 4 pages.
Japanese Patent Application No. 2019-156513 English translation of Office Action dated Nov. 4, 2020, 4 pages.

* cited by examiner

SYSTEM AND METHOD FOR CONTROLLING TRAFFIC LIGHTS

CROSS-REFERENCE TO RELATED APPLICATION

This application claims priority to and benefits of Chinese Patent Application Serial No. 201811012996.2, filed with the National Intellectual Property Administration of P. R. China on Aug. 31, 2018, the entire content of which is incorporated herein by reference.

FIELD

The present disclosure relates to the field of traffic technologies, and more particularly to a system and a method for controlling traffic lights.

BACKGROUND

In a traditional traffic system, the traffic signal light is usually controlled in a predetermined time cycle, that is, durations of a green light, a yellow light and a red light are fixed according to a statistical result of historical traffic flows.

However, as the traffic situation becomes more and more complex nowadays, the traffic flow, for example at a same intersection, may changes greatly in different time periods. Therefore, the fixed traffic light durations cannot meet requirements of the complex changes in the traffic flow. The existing method for controlling traffic lights lacks flexibility.

SUMMARY

In embodiments of a first aspect of the present disclosure, a system for controlling traffic lights is provided, including: a traffic light device, and a smart roadside device, including: a roadside sensing module including: a camera assembly configured to collect information of an image for traffic lights of the traffic light device, and a radar configured to acquire first surrounding environment information of a road junction monitored by the smart roadside device, and a roadside processing module, configured to: determine traffic flow information of a red light lane according to the first surrounding environment information and the information of the image for the traffic lights, determine a duration of a green light according to the traffic flow information, and control a duration displaying the green light in a next cycle of the traffic light device according to the duration of the green light.

In embodiments of a second aspect of the present disclosure, a method for controlling traffic lights is provided, including: collecting information of an image for traffic lights of a traffic light device via a camera assembly; acquiring, via a radar, first surrounding environment information of a road junction monitored by a smart roadside device; determining traffic flow information of a current red light lane according to the first surrounding environment information and the information of the image for the traffic lights; and determining a duration of a green light according to the traffic flow information, and controlling a duration displaying the green light in a next cycle of the traffic light device according to the duration of the green light.

In embodiments of a third aspect of the present disclosure, a non-transitory computer-readable storage medium having stored therein computer programs that, when executed by a processor, cause the processor to perform a method for controlling traffic lights as described in above embodiments.

BRIEF DESCRIPTION OF THE DRAWINGS

These and other aspects and advantages of embodiments of the present disclosure will become apparent and more readily appreciated from the following descriptions made with reference to the drawings, in which.

Figure 1:
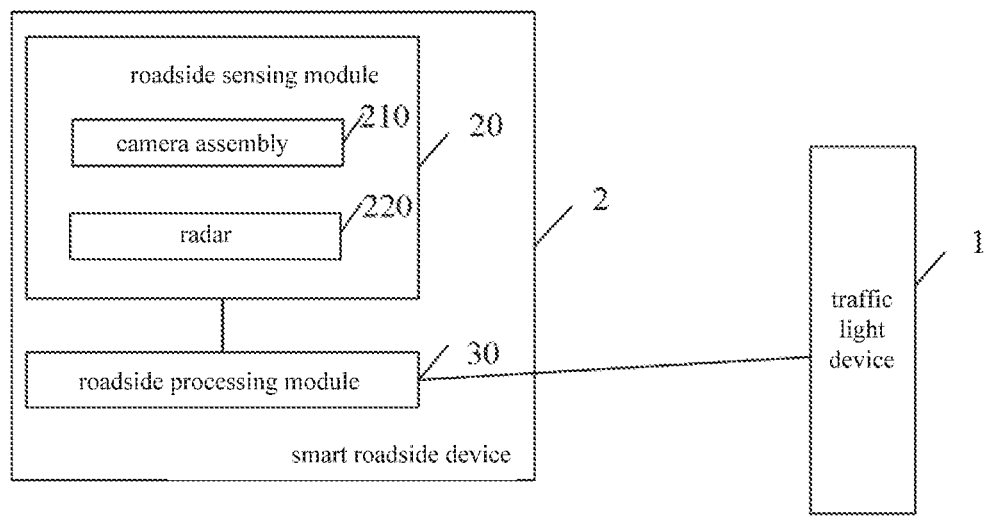
FIG. 1 is a block diagram showing a structure of a system for controlling traffic lights according to an embodiment of the present disclosure.

REFERENCE NUMERALS traffic light device 1, smart roadside device 2, autonomous vehicle 3, roadside sensing module 20, roadside processing module 30, roadside communication module 40, camera assembly 210, radar 220, first radar 221, second radar 222.

DETAILED DESCRIPTION

Reference will be made in detail to embodiments of the present disclosure. The same or similar elements and the elements having same or similar functions are denoted by same or like reference numerals throughout the descriptions. The embodiments described herein with reference to drawings are explanatory, illustrative, and configured to generally understand the present disclosure. The embodiments shall not be construed to limit the present disclosure.

System and method for controlling traffic lights are described below with reference to the accompanying drawings.

FIG. 1 is a block diagram showing a structure of a system for controlling traffic lights according to an embodiment of the present disclosure.

As shown in FIG. 1, the system for controlling traffic lights includes a traffic light device 1 and a smart roadside device 2. The smart roadside device 2 includes a roadside sensing module 20 and a roadside processing module 30.

Specifically, the roadside sensing module 20 includes a camera assembly 210 configured to collect information of an image for traffic lights of the traffic light device 1, and a radar 220 configured to acquire first surrounding environment information of a road junction monitored by the smart roadside device 2.

The roadside processing module 30 is configured to determine traffic flow information of a red light lane according to the first surrounding environment information and the information of the image for the traffic lights, determine a duration of a green light according to the traffic flow information, and control a duration displaying the green light in a next cycle of the traffic light device 1 according to the duration of the green light.

In an embodiment, the traffic flow information includes, but is not limited to, an amount of vehicles, a type and a length of a vehicle.

It should be understood that the positional relationship between the traffic light device 1 and the smart roadside device 2 may be set differently. For example, in order to accurately acquire the traffic flow information of the road junction, the smart roadside device 2 may be arranged near the road junction where the traffic light device 1 is positioned.

Specifically, the smart roadside device 2 is communicated with the traffic light device 1, for example in a wireless manner. The smart roadside device 2 may determine the traffic flow information of the red light lane according to the environment information at the road junction, determine the duration of the green light according to the traffic flow information, and adjusting the duration displaying the green light in a next cycle of the traffic light device 1 as the duration of the green light. Therefore, a duration in which a traffic light, for example a green light or a red light, is turned on or displayed, may be dynamically adjusted according to the traffic flow information at the road junction.

With the system for controlling traffic lights according to the embodiments of the present disclosure, the traffic flow information of the road junction may be acquired by the smart roadside device 2 and durations of the traffic lights at the road junction may be flexibly adjusted according to the traffic flow information, thus improving traffic efficiency and reducing congestion at the road junction.

Figure 2:
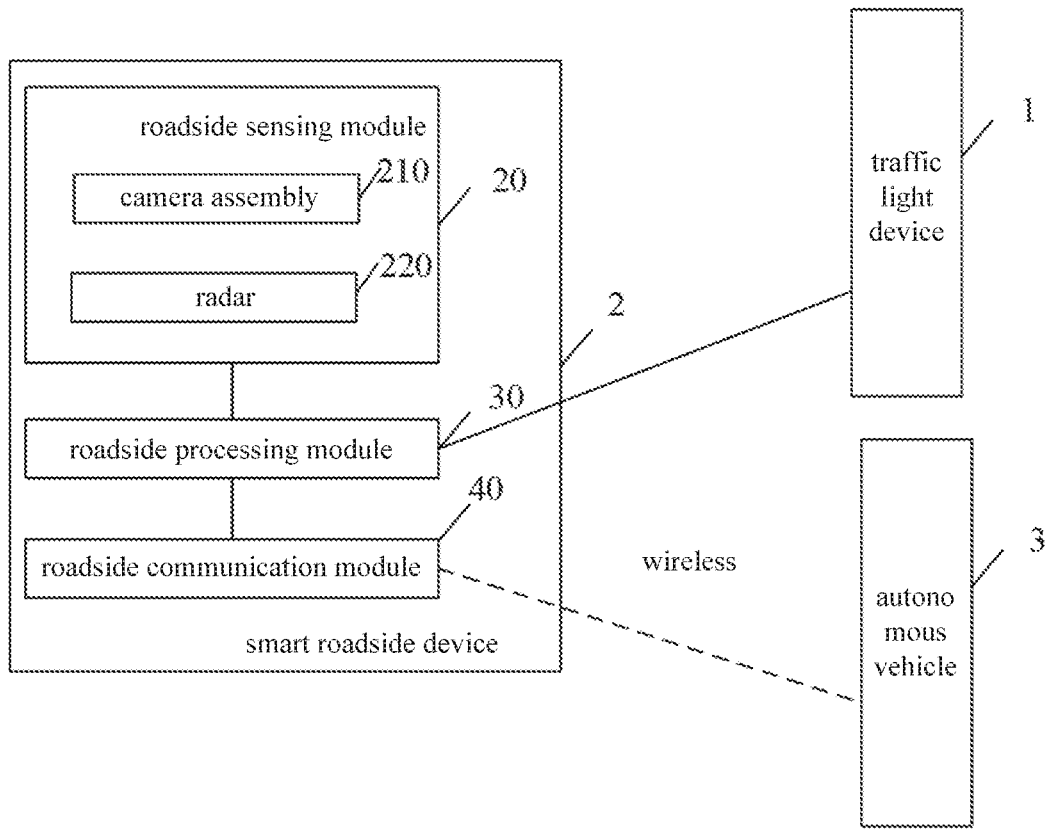
FIG. 2 is a block diagram showing a structure of a system for controlling traffic lights according to another embodiment of the present disclosure.

It should be noted that an autonomous vehicle 3 has a relative small sensing range and is easily obstructed, and an in-vehicle camera may be influenced by a high beam from a vehicle driving towards the autonomous vehicle 3. In order to improve the quality for sensing the environment around the autonomous vehicle 3, besides the components shown in FIG. 1, the system is further included with the autonomous vehicle 3, and the smart roadside device 2 further includes a roadside communication module 40 as shown in FIG. 2.

Specifically, the autonomous vehicle 3 is configured to acquire second surrounding environment information around the autonomous vehicle 3.

In an embodiment, the roadside processing module 30 is further configured to send the first surrounding environment information to the autonomous vehicle 3 via the roadside communication module 40. The autonomous vehicle 3 is further configured to merge the first surrounding environment information with second surrounding environment information, and control a driving behavior according to merged surrounding environment information.

In this embodiment, the autonomous vehicle 3 may receive the surrounding environment information sensed by the smart roadside device 2, and merge the surrounding environment information which is sensed by itself with the received surrounding environment information to acquire final surrounding environment information, and make a strategy of an automatic driving behavior according to the final surrounding environment information. On this basis, a zone which cannot be detected by the autonomous vehicle 3 may be supplemented by the surrounding environment information collected by the smart roadside device 2, thus improving driving safety of the autonomous vehicle 3.

In an embodiment, in order to further improve the driving safety of the autonomous vehicle 3, the roadside processing module 30 is further configured to send at least one of time and duration displaying the green light to the autonomous vehicle 3. The autonomous vehicle 3 may determine the driving behavior, which is in accordance with the traffic rules, based on at least one of the time and duration displaying the green light, and the surrounding environment information, thus improving the driving safety of the autonomous vehicle 3.

In order to accurately acquire the traffic flow information, in an embodiment of the present disclosure, the autonomous vehicle 3 is further configured to send the second surrounding environment information to the smart roadside device 2, and the roadside processing module 30 is further configured to merge the first surrounding environment information with the second surrounding environment information.

In this embodiment, the smart roadside device 2 may merge the surrounding environment information of the road junction sensed by itself with the surrounding environment information sensed by the autonomous vehicle 3, to acquire more accurate environment information, thus further improving the accuracy of the traffic flow information determined by the smart roadside device 2.

Figure 3:
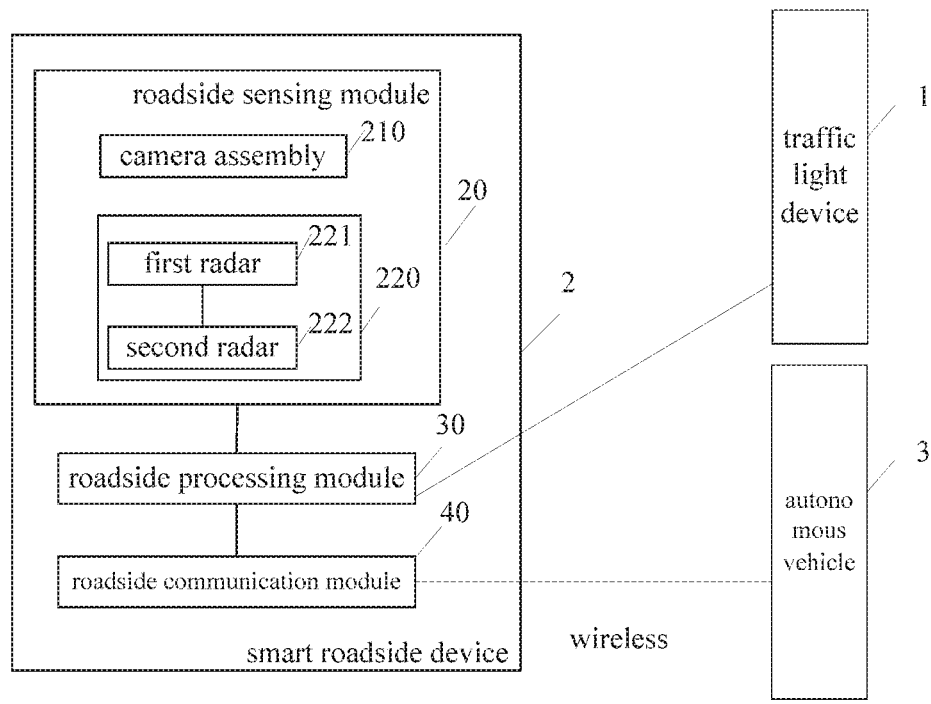
FIG. 3 is a block diagram showing a structure of a system for controlling traffic lights according to a further embodiment of the present disclosure.

In an embodiment, as shown in FIG. 3, the radar 220 includes a first radar 221 and a second radar 222. The first and second radar 221, 222 may be applied for acquiring the surrounding environment information, for example of a target vehicle, more accurately.

Specifically, the first radar 221 is configured to detect surrounding environment information within a detection coverage of the first radar 221, and the second radar 222 is configured to detect surrounding environment information within a detection coverage of the second radar 222.

In an embodiment, a detection distance of the first radar 221 is greater than a detection distance of the second radar 222.

The roadside processing module 30 is further configured to determine information of obstacles near the target vehicle and obstacles far from the target vehicle according to the surrounding environment information detected by the first radar 221, the surrounding environment information detected by the second radar 222 and the image information collected by the camera assembly 210.

In this embodiment, the first radar 221 and the second radar 222 may accurately acquire the surrounding environment information for a relative long distant and for a relative short distance, respectively. On this basis, the roadside processing module 30 may determine the information of obstacles near and far from the target vehicle according to the surrounding environment information detected by the first radar 221 and the second radar 222.

It should be noted that, in order to further improve the capability for detecting obstacles, the type of the first radar 221 and the second radar 222 may be determined to be the same or different from each other.

In an embodiment, the first radar 221 and the second radar 222 are both laser radars.

For example, the first radar 221 is a 64-line laser radar and the second radar 222 is a 16-line laser radar.

For another example, in order to accurately acquire the surrounding environment information, the smart roadside device 2 may be provided with one 64-line laser radar and several (for example three or four) 16-line laser radars.

In another embodiment, the first radar 221 is a laser radar and the second radar 222 is a millimeter wave radar.

In a further embodiment, the first radar 221 is a laser radar and the second radar 222 is a microwave radar.

It should be noted that the first radar 221, the second radar 222 and the camera assembly 210 may be positioned differently. In an embodiment, the first radar 221 is located above the camera assembly 210, and the second radar 222 is located below the camera assembly 210.

In an embodiment, one or more camera assemblies 210 may be provided. Moreover, in an embodiment, the image for the traffic lights captured by the camera assembly 210 may include information of the road junction where the traffic lights are positioned. For example, there is a plurality of camera assemblies 210 corresponding to the road junction monitored by the smart roadside device 2, and these camera assemblies 210 may be arranged at different positions and in different directions to collect the information of the image for the road junction including the traffic lights, thus further improving accuracy and reliability of a generated point cloud image.

In order to reduce the interference caused by components such as sensors and radars on the camera assembly 210, in an embodiment, a shielding layer may cover at least part of the camera assembly 210, so as to reduce the interference caused by the radar 220, thus increasing the imaging clarity of the camera assembly 210 and improving the reliability of roadside smart device 2.

In an embodiment, the shielding layer does not cover camera lenses and heat dissipation components of the camera assembly 210, in other words, the shielding layer covers components other than the lenses and the heat dissipation components of the camera assembly 210, so as to reduce the interference caused by the radar 220, thus increasing the imaging clarity of the camera assembly 210 and improving the reliability of roadside smart device 2.

In embodiments of the present disclosure, a method for controlling traffic lights is provided. Such a method may be performed by the system for controlling traffic lights described above, which is not described in details herein again.

Figure 4:
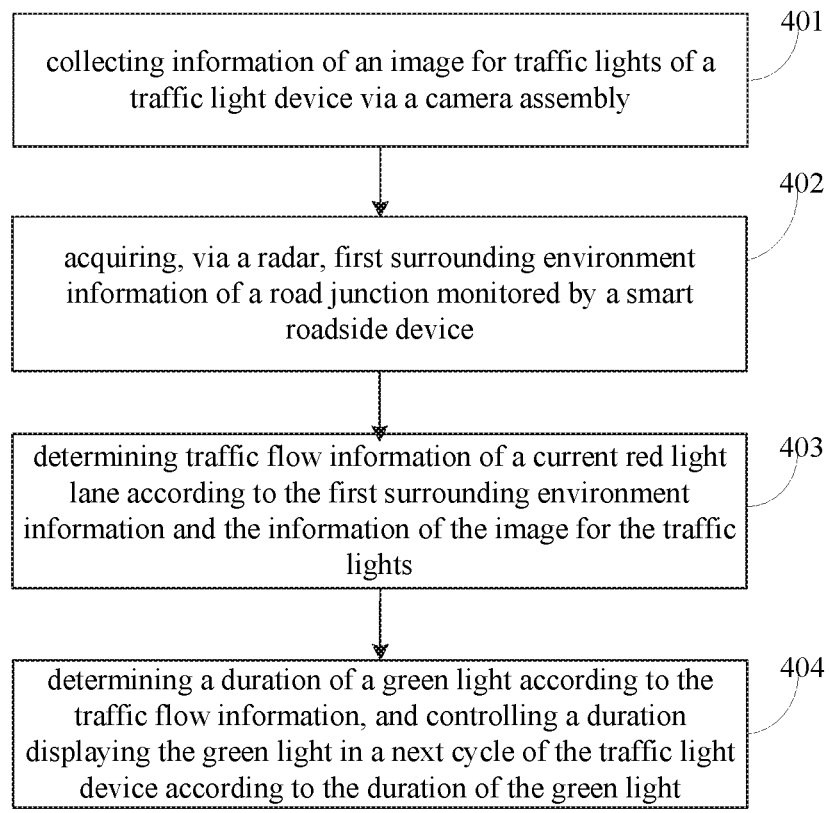
FIG. 4 is a flow chart of a method for controlling traffic lights according to an embodiment of the present disclosure.
Figure 5:
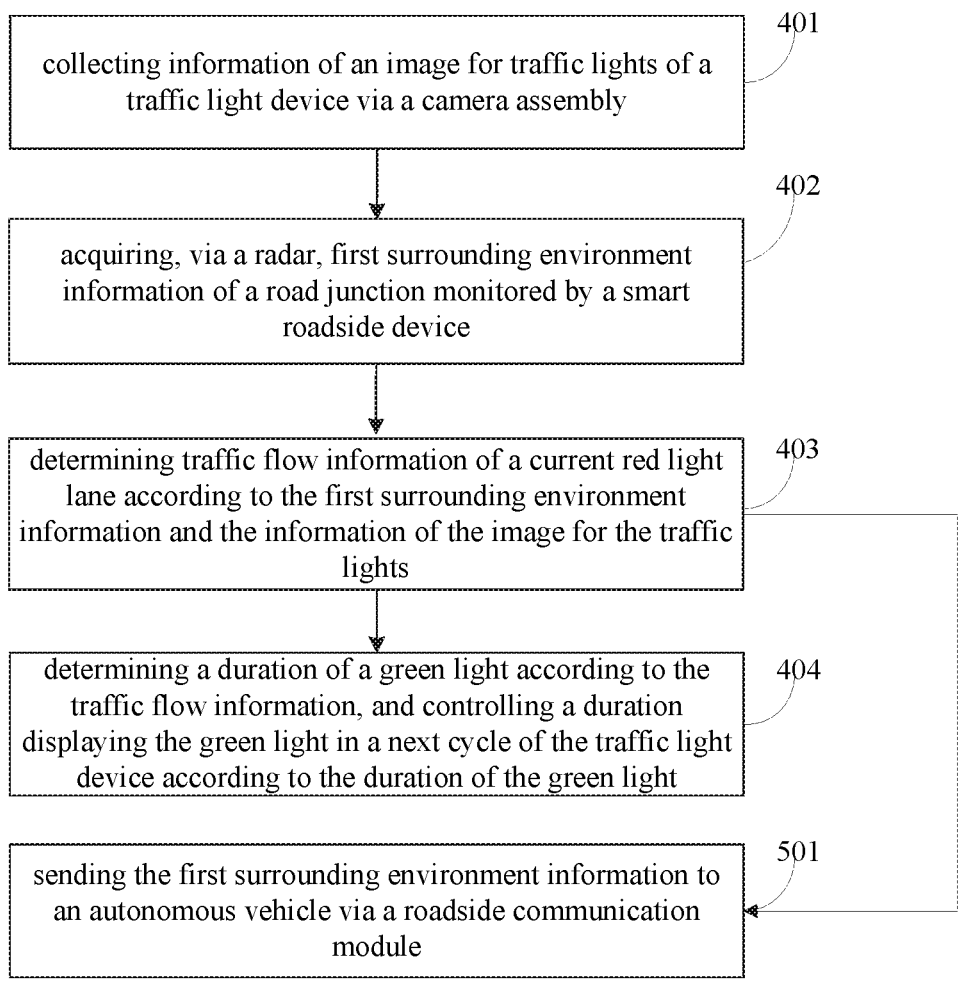
FIG. 5 is a flow chart of a method for controlling traffic lights according to another embodiment of the present disclosure.

FIG. 4 is a flow chart of a method for controlling traffic lights according to an embodiment of the present disclosure.

As shown in FIG. 4, the method for controlling traffic lights includes following steps.

In block 401, information of an image for traffic lights of a traffic light device is collected via a camera assembly.

In block 402, first surrounding environment information of the road junction monitored by a smart roadside device is acquired via a radar.

In block 403, traffic flow information of a current red light lane is determined according to the first surrounding environment information and the information of the image for the traffic lights.

In block 404, a duration of a green light is determined according to the traffic flow information, and a duration displaying the green light in a next cycle of the traffic light device is controlled according to the duration of the green light.

With the method for controlling traffic lights according to the embodiments of the present disclosure, the traffic flow information of the road junction may be acquired by the smart roadside device and durations of the traffic lights at the road junction may be flexibly adjusted according to the traffic flow information, thus improving traffic efficiency and reducing congestion at the road junction.

It should be noted that an autonomous vehicle has a relatively small sensing range and is easily obstructed, and an in-vehicle camera may be influenced by a high beam from a vehicle driving towards the autonomous vehicle. In order to improve the quality for sensing the environment around the autonomous vehicle, besides the steps shown in FIG. 4, the method includes a further step.

In block 501, the first surrounding environment information is sent to an autonomous vehicle via a roadside communication module.

Accordingly, the autonomous vehicle receives the first surrounding environment information from the smart roadside device, merges the first surrounding environment information with second surrounding environment information sensed by the vehicle itself, and controls a driving behavior according to merged surrounding environment information.

Figure 6:
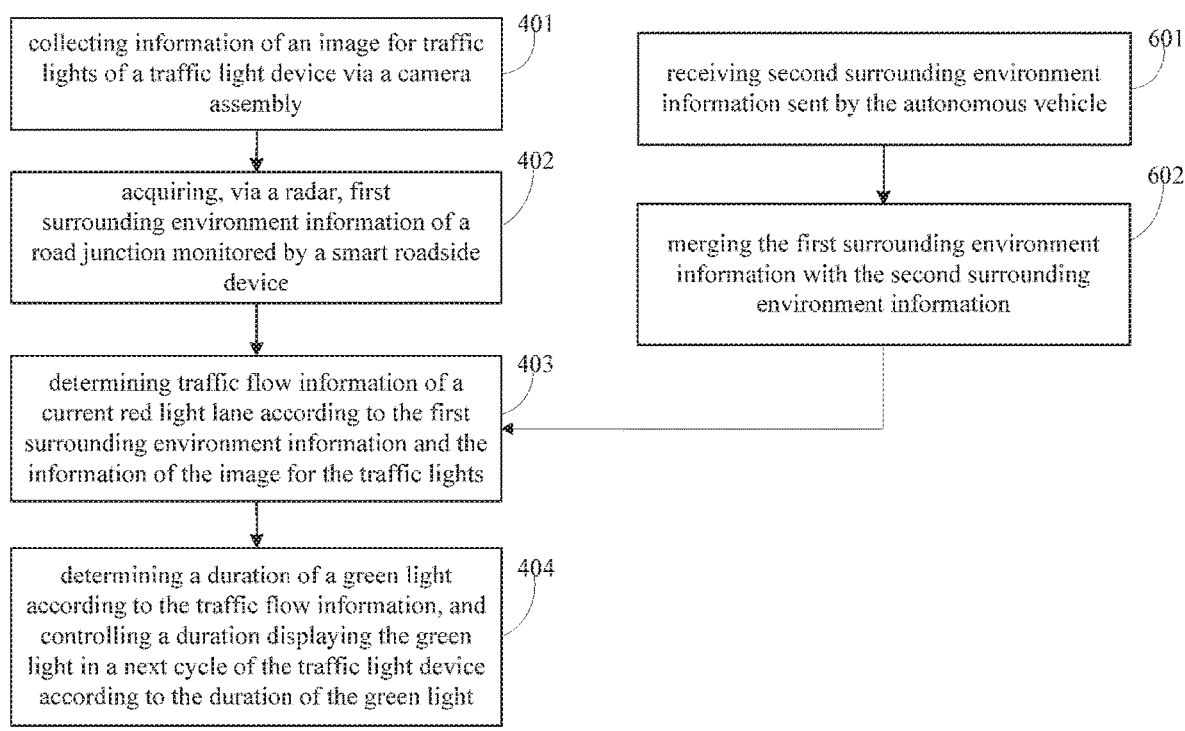
FIG. 6 is a flow chart of a method for controlling traffic lights according to a further embodiment of the present disclosure.

In order to acquire the traffic flow information more accurately, besides the steps shown in FIG. 4, the method further includes following steps as shown in FIG. 6.

In block 601, second surrounding environment information sent by the autonomous vehicle is received.

In block 602, the first surrounding environment information is merged with the second surrounding environment information.

In an embodiment of the present disclosure, a non-transitory computer-readable storage medium is provided, having stored therein computer programs that, when executed by a processor, cause the processor to perform a method for controlling traffic lights as described above.

In an embodiment of the present disclosure, a computer program product is provided, having stored therein instructions that, when executed by a processor of a device, cause the device to perform a method for controlling traffic lights as described above.

In the specification, unless specified or limited otherwise, relative terms such as "length", "width", "thickness", "inner", "outer", "lower", "upper", "horizontal", "vertical", "above", "below" as well as derivative thereof should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance. Thus, the feature defined with "first" and "second" may include one or more this feature. In the description of the present disclosure, unless specified otherwise, "a plurality of" means two or more than two, for example, two or three.

In the specification, unless specified or limited otherwise, the terms "mounted", "connected", "coupled" and "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the specification, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the order of execution is different from what is shown or discussed, including executing functions in a substantially simultaneous manner or in an opposite order according to the related functions. These and other aspects should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc It can be understood that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A system for controlling traffic lights, comprising:
a traffic light device, and
a smart roadside device, comprising:
  a roadside sensing module comprising:
    a camera assembly configured to collect information of an image for traffic lights of the traffic light device, and
    a radar configured to acquire first surrounding environment information of a road junction monitored by the smart roadside device, and
  a roadside processing module, configured to:
    determine traffic flow information of a red light lane according to the first surrounding environment information and the information of the image for the traffic lights,
    determine a duration of a green light according to the traffic flow information, and
    control a duration displaying the green light in a next cycle of the traffic light device according to the duration of the green light,
  wherein the radar comprises:
    a first radar configured to detect surrounding environment information within a detection coverage of the first radar, and
    a second radar configured to detect surrounding environment information within a detection coverage of the second radar,
  wherein a detection distance of the first radar is greater than a detection distance of the second radar, and a combination of the first radar and the second radar is any one selected from the group consisting of:

the first radar being a 64-line laser radar and the second radar being a 16-line laser radar, the first radar being a laser radar and the second radar being a millimeter wave radar, and the first radar being a laser radar and the second radar being a microwave radar.

2. The system according to claim 1, wherein the system further comprises an autonomous vehicle configured to acquire second surrounding environment information around the autonomous vehicle.

3. The system according to claim 2, wherein the smart roadside device further comprises a roadside communication module, wherein the roadside processing module is further configured to send the first surrounding environment information to the autonomous vehicle via the roadside communication module;

the autonomous vehicle is configured to merge the first surrounding environment information with the second surrounding environment information, and control a driving behavior according to merged surrounding environment information.

4. The system according to claim 2, wherein the autonomous vehicle is further configured to send the second surrounding environment information to the smart roadside device; and the roadside processing module is further configured to merge the first surrounding environment information with the second surrounding environment information.

5. The system according to claim 1, wherein the smart roadside device is arranged near the road junction where the traffic light device is positioned.

6. The system according to claim 1, wherein the first radar is located above the camera assembly, and the second radar is located below the camera assembly.

7. The system according to claim 1, further comprising:
a shielding layer covering at least part of the camera assembly.

8. The system according to claim 7, wherein the shielding layer does not cover camera lenses and heat dissipation components of the camera assembly.

9. A method for controlling traffic lights, comprising:
collecting information of an image for traffic lights of a traffic light device via a camera assembly;
acquiring, via a radar, first surrounding environment information of a road junction monitored by a smart roadside device;
determining traffic flow information of a current red light lane according to the first surrounding environment information and the information of the image for the traffic lights; and
determining a duration of a green light according to the traffic flow information, and controlling a duration displaying the green light in a next cycle of the traffic light device according to the duration of the green light,
wherein the radar comprises:
a first radar configured to detect surrounding environment information within a detection coverage of the first radar, and
a second radar configured to detect surrounding environment information within a detection coverage of the second radar,
wherein a detection distance of the first radar is greater than a detection distance of the second radar, and a combination of the first radar and the second radar is any one selected from the group consisting of:

the first radar being a 64-line laser radar and the second radar being a 16-line laser radar, the first radar being a laser radar and the second radar being a millimeter wave radar, and the first radar being a laser radar and the second radar being a microwave radar.

10. The method according to claim 9, wherein controlling the duration displaying the green light in the next cycle of the traffic light device according to the duration of the green light comprises:
adjusting the duration displaying the green light in the next cycle of the traffic light device as the duration of the green light determined according to the traffic flow information.

11. The method according to claim 9, further comprising:
sending the first surrounding environment information to an autonomous vehicle via a roadside communication module.

12. The method according to claim 9, further comprising:
receiving second surrounding environment information sent by the autonomous vehicle,
merging the first surrounding environment information with the second surrounding environment information.

13. A non-transitory computer-readable storage medium having stored therein computer programs that, when executed by a processor, cause the processor to perform the method according to claim 9 for controlling traffic lights, the method comprising:
collecting information of an image for traffic lights of a traffic light device via a camera assembly;
acquiring, via a radar, first surrounding environment information of a road junction monitored by a smart roadside device;
determining traffic flow information of a current red light lane according to the first surrounding environment information and the information of the image for the traffic lights; and
determining a duration of a green light according to the traffic flow information, and controlling a duration displaying the green light in a next cycle of the traffic light device according to the duration of the green light,
wherein the radar comprises:
a first radar configured to detect surrounding environment information within a detection coverage of the first radar, and
a second radar configured to detect surrounding environment information within a detection coverage of the second radar,
wherein a detection distance of the first radar is greater than a detection distance of the second radar, and a combination of the first radar and the second radar is any one selected from the group consisting of:
the first radar being a 64-line laser radar and the second radar being a 16-line laser radar,
the first radar being a laser radar and the second radar being a millimeter wave radar, and
the first radar being a laser radar and the second radar being a microwave radar.

14. The non-transitory computer-readable storage medium according to claim 13, wherein the method further comprises:
sending the first surrounding environment information to an autonomous vehicle via a roadside communication module.

15. The non-transitory computer-readable storage medium according to claim 13, wherein the method further comprises:

receiving second surrounding environment information sent by the autonomous vehicle, merging the first surrounding environment information with the second surrounding environment information.

\* \* \* \* \*